United States Patent [19]

Knebel et al.

[11] Patent Number: 5,198,001
[45] Date of Patent: Mar. 30, 1993

[54] APPARATUS AND PROCESS FOR REMOVING ORGANIC COMPOUNDS FROM A GAS STREAM

[75] Inventors: William J. Knebel, Mars; Utpal Sengupta, Wexford; N. R. Pollack; Gilbert Palmgren, both of Pittsburgh, all of Pa.

[73] Assignee: Calgon Carbon Corporation, Pittsburgh, Pa.

[21] Appl. No.: 759,029

[22] Filed: Sep. 13, 1991

[51] Int. Cl.⁵ ............................................. B01D 53/04
[52] U.S. Cl. ........................................ 55/28; 55/59; 55/62; 55/68; 55/74; 55/179; 55/387
[58] Field of Search ................................ 55/25–28, 55/31, 33, 59, 62, 68, 74, 75, 161-163, 179, 180, 387, 389

[56] References Cited

U.S. PATENT DOCUMENTS

| | | | |
|---|---|---|---|
| 2,918,140 | 12/1959 | Brooks | 55/62 X |
| 3,102,013 | 8/1963 | Skarstrom | 55/62 X |
| 3,231,512 | 1/1966 | Harter | 55/33 X |
| 3,237,379 | 3/1966 | Kant et al. | 55/62 X |
| 3,455,089 | 7/1969 | Mattia | 55/62 |
| 3,468,103 | 9/1969 | Hergt | 55/33 |
| 4,104,039 | 8/1978 | Kuri et al. | 55/25 X |
| 4,203,734 | 5/1980 | Winter et al. | 55/26 |
| 4,414,003 | 11/1983 | Blaudszun | 55/28 X |
| 4,516,985 | 5/1985 | Winter | 55/25 X |
| 4,636,225 | 1/1987 | Klein et al. | 55/33 X |
| 4,846,852 | 7/1989 | Schweitzer et al. | 55/33 X |
| 4,859,216 | 8/1989 | Fritsch | 55/28 |
| 4,966,611 | 10/1990 | Schumacher et al. | 55/20 |
| 5,069,689 | 12/1991 | Goldhaar | 55/62 X |

*Primary Examiner*—Robert Spitzer
*Attorney, Agent, or Firm*—Reed Smith Shaw & McClay

[57] ABSTRACT

Apparatus and methods are disclosed for removing organic compounds from gas streams containing same in which the gas stream is directed through a number of graded bed adsorbers. The graded bed adsorbents are regenerated in situ by using a heated regeneration which is produced from a cooled flue gas formed by combustion of a fuel gas and the thermal oxidation of desorbed organic compounds collected during the regeneration process.

29 Claims, 5 Drawing Sheets

APPARATUS AND PROCESS FOR REMOVING ORGANIC COMPOUNDS FROM A GAS STREAM

FIELD OF THE INVENTION

The present invention relates to apparatus and process for removing organic compounds from a process stream using a plurality of carbon adsorbents and regenerating those adsorbents in situ.

BACKGROUND OF THE INVENTION

There is an increasing emphasis on abatement of volatile organic compounds (VOCs) from industrial emissions and VOC emissions from remedial projects. With the passage of the 1990/1991 Clean Air Amendment, the need for an efficient and cost effective process to control emissions of volatile organic compounds (VOCs) from industrial sources such as paint spray booths, dry cleaning operations, semiconductor manufacture, etc., and from remedial projects such as landfill gas stripping operations, has become increasingly important. Due to the low VOC concentrations typically generated by these sources (<2000 ppmv) processes such as direct incineration and solvent recovery are not economically feasible. However, the concentrations are high enough to shorten the bed life of nonregenerable activated carbon filters, thus making them impractical to use.

Presently the most cost effective process for removing VOCs combines direct thermal oxidation of VOC constituents and activated carbon adsorption technology. This process which is practiced by the assignee of this application is known as the CADRE process and has been sold and successfully implemented throughout the United States. This process utilizes a single grade or type of adsorbent such as activated carbon, which is contained in two or more cylindrical vessels to adsorb the volatile organic compounds which are introduced to the activated carbon beds in a relatively low concentration gas stream (less than 2000 ppmv). When the activated carbon in a vessel becomes saturated with the VOCs, it is taken off line and the carbon is regenerated by passing a hot gas through the bed countercurrently to the adsorption flow. The hot gas is obtained by taking a portion of the flue gas from a thermal oxidizer used to oxidize the organic compounds and cooling it to the desired regeneration temperature (typically 100°–400° C.).

The thermal oxidizer flue gas is preferably cooled by one of several methods, including diluting the flue gas with ambient air or injecting water into the flue gas stream. The particular method used depends upon a number of factors including the reactivity of the VOCs adsorbed on the carbon bed. For highly reactive VOCs, such as ketones, it is preferable to use water injection to lower the oxygen content of the regeneration gas. Air dilution is preferred, however, where the compounds are relatively nonreactive or where the VOC stream contains chlorinated hydrocarbons which could lead to the formation of corrosive acids if water were present in the regeneration gas.

In the process of regenerating the carbon bed, a small volume of gas containing high concentrations of the VOC's is produced which is then introduced into the thermal oxidizer where greater than 99% of the VOS's are destroyed. Typically, the system is designed such that the onstream adsorption time is much greater than the regeneration time. Thus, the operation of the thermal oxidizer is intermittent, which significantly reduces costs of fuel. In addition, the operation of the process is designed to be continuous in that at least one adsorber is always on line while the other is either being regenerated or on standby. As a result, removal efficiencies of 95% or better are achieved.

Notwithstanding the success and effectiveness of this process, improvements are needed to meet the more stringent VOC emission levels being adopted by environmental and regulatory agencies (at both the state and federal levels) as well as for an ever increasing number of organic compounds.

Accordingly, it is an object of the present invention to provide a method and means for achieving higher removal levels of organic compounds from process gas streams. It is another object of the invention to provide greater efficiencies at higher removal levels for a larger number of organic compounds.

SUMMARY OF THE INVENTION

Generally, the present invention provides a method and means for removing organic compounds, preferably volatile organics from a gas stream containing such compounds. Basically, the method provides for passing the gas stream through at least two beds of adsorbents each having a different physical or chemical makeup, referred to herein as graded "beds". The passage of gas is discontinued when the exit level of organic compounds exceed a predetermined level. The adsorber beds are then regenerated with a hot flue gas, preferably humidified, to desorb the compounds previously adsorbed. These desorbed organics are then collected and preferably thermally oxidized.

The present invention optimizes the adsorption and desorption characteristics of a particular adsorber configuration. Typically, VOC's are segregated in the adsorber, with the heaviest compounds concentrated in the top and lightest components in the bottom. The graded bed adsorber takes advantage of this segregation by layering the adsorber with two or more beds of adsorbents specifically designed for the VOCs that will concentrate in that portion of the adsorber. The adsorbents for graded beds are selected to provide the maximum adsorption capacity and regenerability (i.e., maximum working capacity) for the specific adsorbate(s) concentrated in that segment of the adsorber. In most instances, the adsorption mechanism is determined by physical adsorbent (i.e. Van der Waals forces). Therefore, pore size distribution of the adsorbent is the primary consideration in selection of adsorbents. Thus, adsorbents with larger pore size distributions are preferred for heavier VOC constituents. Adsorbents with a smaller pore size distribution are preferred for the adsorption of lighter VOCs. The high potential energy for adsorption associated with the smaller pore sized adsorbent provides a much greater adsorption capacity for the ligher VOCs.

Preferably, the graded bed adsorber of the present invention utilizes physical adsorbents such as activated carbon. However, zeolites, molecular sieve materials, silica gel, and other adsorbents/absorbents may also be used. In addition, catalysts can be placed in the adsorber bed to either convert, for example, non-adsorbable VOCs to harmless $CO_2$ and water in situ or to convert to another compound which is more readily adsorbable. For example, no carbonaceous adsorbent is available which adsorbs methanol to any significant degree.

Thus, a supported catalyst such as platinum or a copper-chromium oxide complex placed at the bottom of an adsorber bed has the capability to oxidize the methanol to $CO_2$ and water.

The apparatus of the present invention is capable of accommodating various adsorbents. Accordingly, a number of different adsorption/regeneration vessels designs can be used. For example, an adsorption/regeneration vessel which segregates the different adsorbents through the use of inert (non adsorbing) materials, e.g., balls, placed between the graded beds is cost effective, but limits the flexibility of the regeneration conditions. In the other embodiment, adsorbents in the vessel are supported by individual support screens which physically separate into graded beds the adsorbents by approximately 1-2 feet. The space between each adsorbent bed is used to accommodate a regeneration gas distribution manifold which is used to independently supply a regeneration gas of a preselected temperature for each adsorbent during regeneration. In another embodiment, each of the graded adsorbents is contained in a separate adsorber vessel. This also allows regeneration of the adsorbent bed temperatures to be independently controlled in both time and temperature. The advantage of this embodiment is that each of the adsorbents can be taken "off line" and regenerated independently. In addition, it permits the fractionation/purification and recovery of a number (usually three or more) organic compounds contained in the VOC stream.

This invention also permits optimizing the adsorption/regeneration process for VOC control. The gas stream containing the VOCs is heated, e.g., to 95° F. to reduce the relative humidity of the gas stream. By lowering the relative humidity of the stream, the competitive adsorption effect of water contained in the gas is minimized thereby increasing the adsorption capacity for the VOCs contained in the gas stream.

Accordingly, the present invention provides increased removals of organics from gaseous streams. The invention provides higher temperatures to better desorb/regenerate the adsorbents, especially when higher molecular weight volatile organic compounds are being desorbed from multiple beds. For regeneration, the flue gas from the oxidizer is preferably humidified to take advantage of the competitive adsorption effects of water on the desorption of the VOCs. Hence, a humidified gas stream containing, e.g., 60% by volume water can remove three to four times as much adsorbed material (e.g., ethylene glycol monobutyl ether acetate) from carbon under the same regeneration conditions as a dry gas stream at the same temperature. In addition to humidifying the regeneration gas stream, the oxygen content of the stream is controlled to less than 5% to minimize the risk of bed exotherms associated with uncontrolled oxidation of reactive adsorbates (e.g., ketones) in the adsorbent bed.

Other advantages of the present invention will become apparent from a perusal of the detailed description of presently preferred embodiments taken in connection with the accompanying drawings.

DETAILED DESCRIPTION OF THE INVENTION

Figure 1:
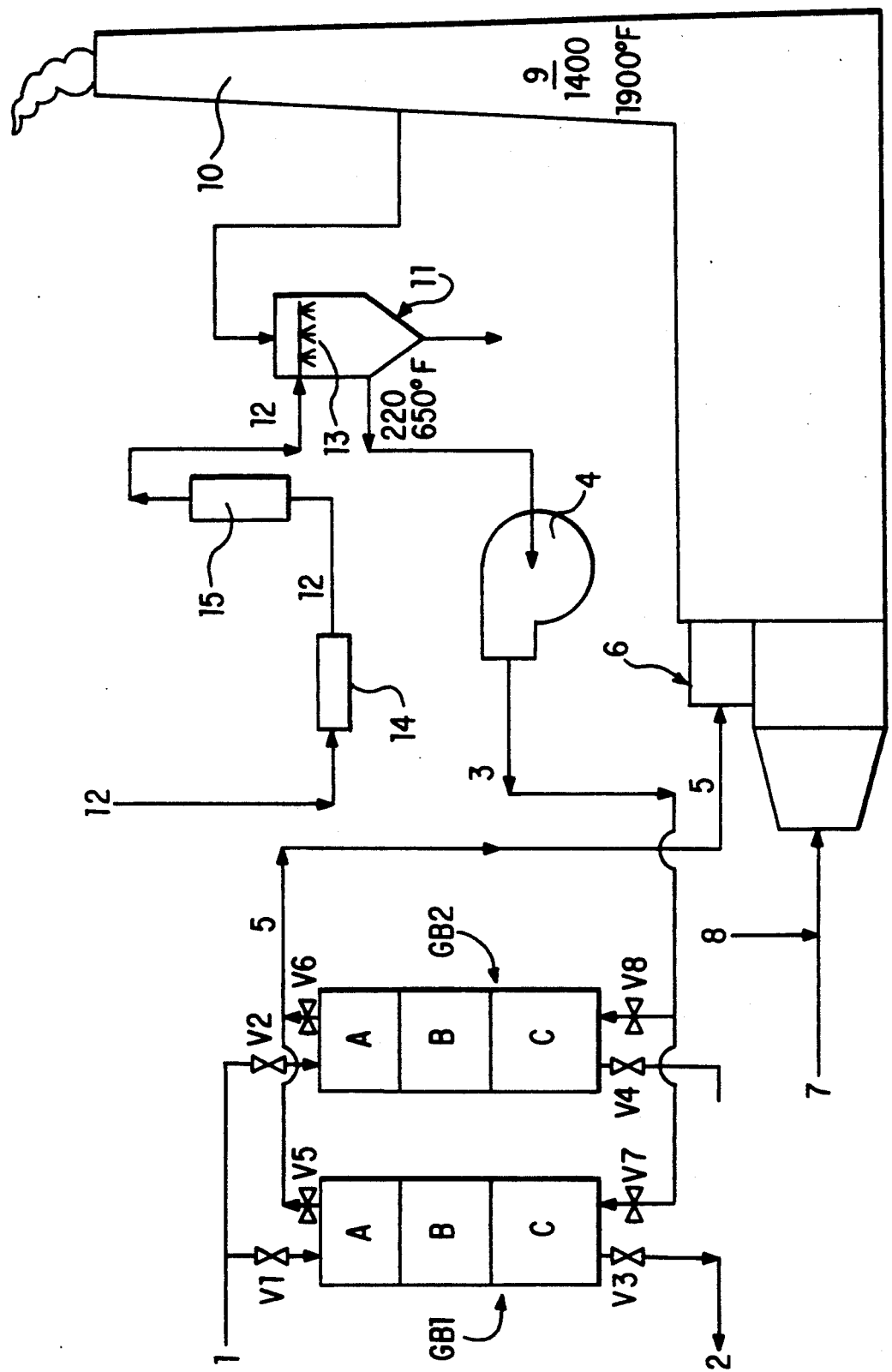
FIG. 1 is a schematic diagram of the apparatus and process of the present invention.

Referring to FIG. 1, in the process of the invention, contaminated air or a process gas stream 1 is introduced into one of several adsorbers, in this case, a first adsorber GB1 and/or a second adsorber GB2. Each adsorber GB1 and GB2 contains more than one grade and type of adsorbent, such as activated carbons and natural zeolites, which may be in granular or pellet form. As shown in FIG. 1, adsorbers GB1 and GB2 includes graded beds A, B and C.

Each of the graded adsorbent beds contain a unique adsorbent (such as various pore sized adsorbents/type of adsorbent, e.g., activated carbon, molecular sieve, zeolite, etc.) or catalyst. Typically one or several of the graded bed adsorbent vessels (GB1 or GB2) is used for adsorption at any given time, while the other vessel is undergoing desorption/regeneration of the adsorbents/catalysts contained therein.

As the contaminated stream 1 passes through the adsorbent/catalyst bed, the VOCs in the contaminated stream are either adsorbed by the adsorbents, or converted to harmless $CO_2$ and water by an oxidation catalyst. Thus, the contaminated gas exits bed 2 having substantially all of the VOCs removed.

After a predetermined adsorption cycle, generally corresponding to the adsorbents approaching a predetermined level of VOC removed or breakthrough of an individual organic component, the gas flow is automatically switched from one adsorber vessel to another, for example, from first adsorber GB1 to second adsorber GB2. At that time, the first adsorber commences a regeneration cycle. This switching is accomplished by a series of isolation valves shown in FIG. 1, which turn off the flow of contaminated process stream 1 to the first adsorber and diverts that flow to the second adsorber. For example, in order to utilize adsorber GB1, valves V1 and V3 are opened, and valves V2, V4, V5 and V7 are closed. In order to simultaneously desorb/regenerate adsorber GB2, valves V6 and V8 are opened. In order to switch adsorbers, the appropriate valves are opened/closed allowing adsorption of gases by adsorber GB2 and regeneration of graded bed GB1.

To begin the regeneration cycle of graded bed GB1, hot (220°-650° F.) regeneration gas 3 is introduced to the adsorber vessel by a regeneration blower 4, typically a high pressure fan. The temperature of the regeneration gas stream(s) is controlled by one of two methods: controlling the amount of cooling/humidification water 12 added to the stream(s), or injecting dilution air to the stream(s). Regenerating gas 3 is introduced to adsorber GB1 through valve V7 in a direction countercurrent to the direction of contaminated/process gas flow through the adsorber, as shown in FIG. 1.

Hot regeneration gas 3, which has a temperature of 220°-650° F., quickly raises the temperature of the beds in adsorber GB1, thus, desorbing the VOCs, and concentrating them.

The effluent stream 5 from the vessels undergoing regeneration contain concentrated VOCs and these are collected for subsequent processing or directed to a combustion means 6. Combustion means 6 is preferably a thermal oxidizer or an afterburner associated with a carbon reactivation plant furnace, or any other suitable combustion means, in a fuel-lean environment. Thermal oxidizer 6 is typically fired with natural gas 7 fed with combustion air 8. As used herein, the term "fuel-lean" means that oxygen is made available and combined within the effluent stream in amounts exceeding the stoichiometric quantities of oxygen required for 100% combustion of the VOCs contained in the effluent stream. Preferably, such excess oxygen results in a process stream 10 containing 1-10% and most preferably 2-5% by volume oxygen following combustion of the VOCs. An oxygen analyzer (not shown) is located in the flue stream to monitor the oxygen content which is preferably maintained in the desired range of 2% to 5%.

Once in combustion means 6, the volatile organic compounds from effluent stream 5 are combusted, destroying substantially all of the volatile organic compounds contained therein. The combustion of these compounds produces hot flue gas 9 which passes through a combustion stack 10. As seen in FIG. 1, a portion of this hot flue gas 9 is removed from the stack 10, and introduced to evaporative cooler/humidifier 11.

The proportion of the hot flue gas 9 which is diverted from the stack to the evaporative cooler/humidifier may vary depending on the particular situation, but generally is less than 50% by volume of the total of the total hot flue gas 9 going through the stack 10.

Evaporative cooler/humidifier 11 uses either cooling water 12 or air, which is introduced to cool the flue gas. Water spray means 13 may use compressed air in order to atomize the cooling water into a fine spray. The cooling water preferably passes through filters 14 and 15 to remove suspended solids prior to reaching evaporative cooler 11.

Prior to entering the evaporative cooler, the hot flue gas has a temperature of between 1400°-1800° F. That portion of the hot flue gas 9 which is introduced to the evaporative cooler/humidifier 11 is cooled by cooling water spray 13 or dilution with ambient air to a temperature of approximately 220°-650° F. Where carbon is used in adsorbers GB1 and GB2 as the adsorbent material, the temperature of the cool flue gas is adjusted and maintained within the appropriate range to prevent exotherms in the beds. Where fine sized carbons are used, it is desirable to maintain the temperature on the lower side of the range, i.e., between about 220° F. and 330° F. taking into consideration the humidity of the regeneration gas.

The regeneration gas is introduced to blower 4, normally a high pressure fan. The regeneration gas is blown by blower 4 to and through the graded adsorbent beds, A, B and C, to complete the regeneration cycle. By introducing the regeneration gas 3 to the adsorbent beds in this manner, the organic compounds are desorbed from the adsorbents. The desorbed organic compounds are then collected in line 5.

This highly concentrated effluent gas stream 5 can be collected or preferably introduced to the combustion means which begins the process again. When the VOC stream contains very reactive compounds such as ketones, the flue gas stream is preferably cooled with water resulting in a regeneration gas stream which preferably contains 1-5% oxygen by volume, and most preferably 2-5% oxygen by volume. If less than 1% oxygen is used, the VOCs are not sufficiently oxidized in thermal oxidizer 6 combustion means. If more than about 5% of volume oxygen is used, the risk of igniting some of the reactive VOCs and possibly the adsorbent in the case of activated carbon, in the adsorber vessel becomes substantial.

In order to control the amount of oxygen in the regeneration gas stream, an oxygen monitor may be placed in the stack 10, and controls may be employed to increase or decrease the amount of oxygen contained in the flue gas 9 entering the evaporative cooler 11. This is typically done by adjusting the amount of combustion air 8 fed to the combustor 6.

In order to start up the regeneration cycle on a cold system, the combustion means 6 is heated to operating temperatures, generally 1400°-1800° F., and sufficient oxygen is introduced to the combustion means to provide a regeneration gas stream of 2-5% by weight oxygen. The regeneration blower 4 is turned on, and one of the inlet valves to the adsorbers, in this case, V7 or V8 is opened, depending upon which adsorber is to be regenerated. The corresponding outlet valve V5 or V6 is likewise opened, to permit effluent gas leaving the adsorber to enter the combustion means.

Figure 2:
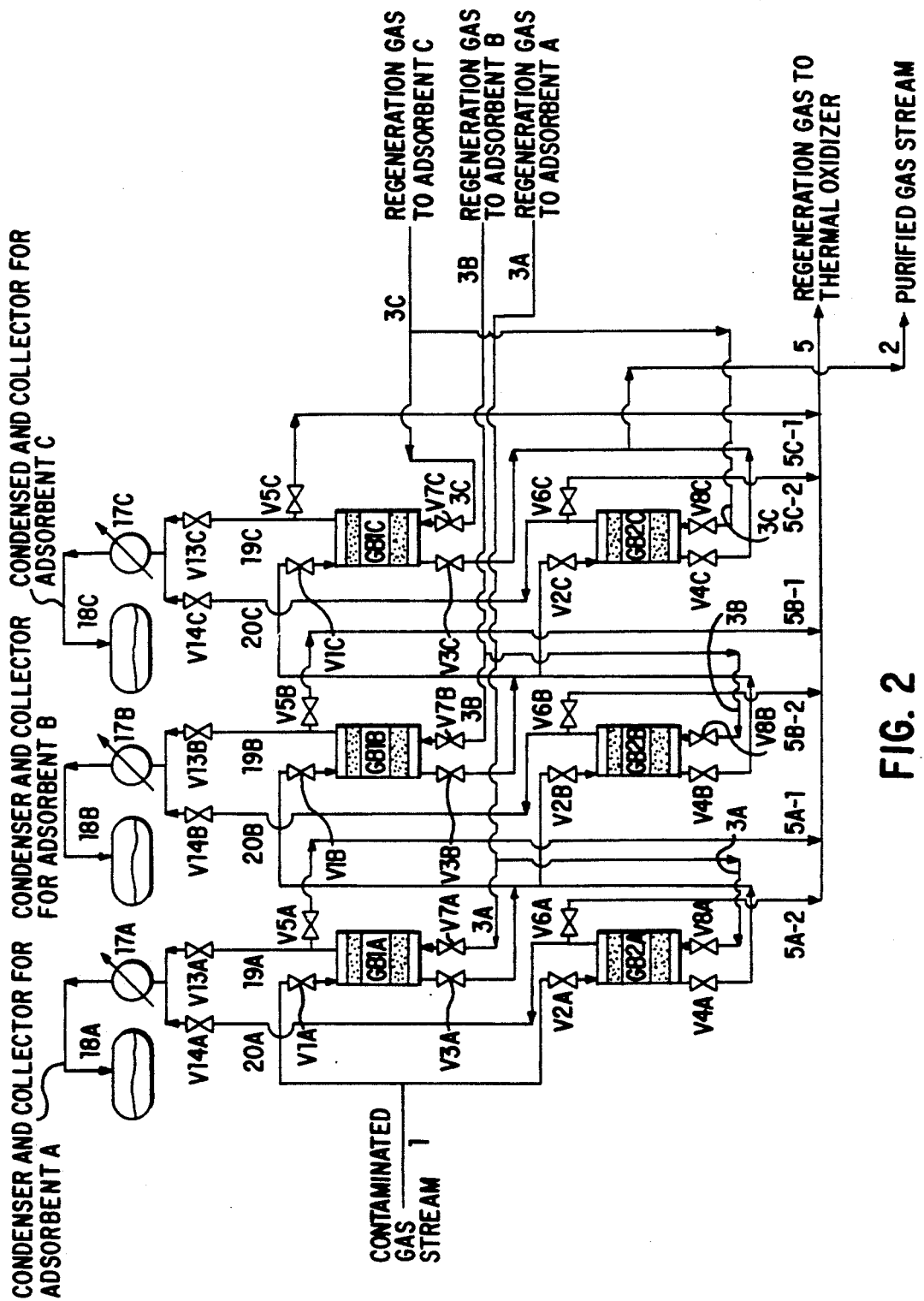
FIG. 2 is a schematic diagram of another embodiment of the apparatus and process of the present invention in which the beds are placed in separate vessels.

Referring to FIG. 2, another embodiment of the system described with reference to FIG. 1 is shown. Similar reference numerals used in FIG. 2 refer to similar features of the system adsorbed in reference to FIG. 1. In this embodiment, each of the adsorbents can be taken off line and regenerated independently. For example, if adsorbent "A" in graded bed adsorber GB2 (GB2A) is to be regenerated while adsorbents B and C in graded bed adsorber GB2 remain on line (GB2B and GB2C), valves 2A, 4A, 1B, 3B, 1C, and 3C, would be closed while valves 1A, 3A, 2B, 4B, 2C, and 4C would be open. Thus, gas stream passes through GB1A, GB2B, and GB2C in series. In addition, this embodiment allows for the fractionation/purification and recovery of three or more organic compounds contained in the VOC stream. During the regeneration of an adsorbent, the regeneration off gas can is sent to condenser 17 and collection 18 drum by closing the value 6A, for example, in the case of GB2A to the oxidizer manifold 5A-2, and opening the valve to the condenser (V14A for GB2A).

Figure 3:
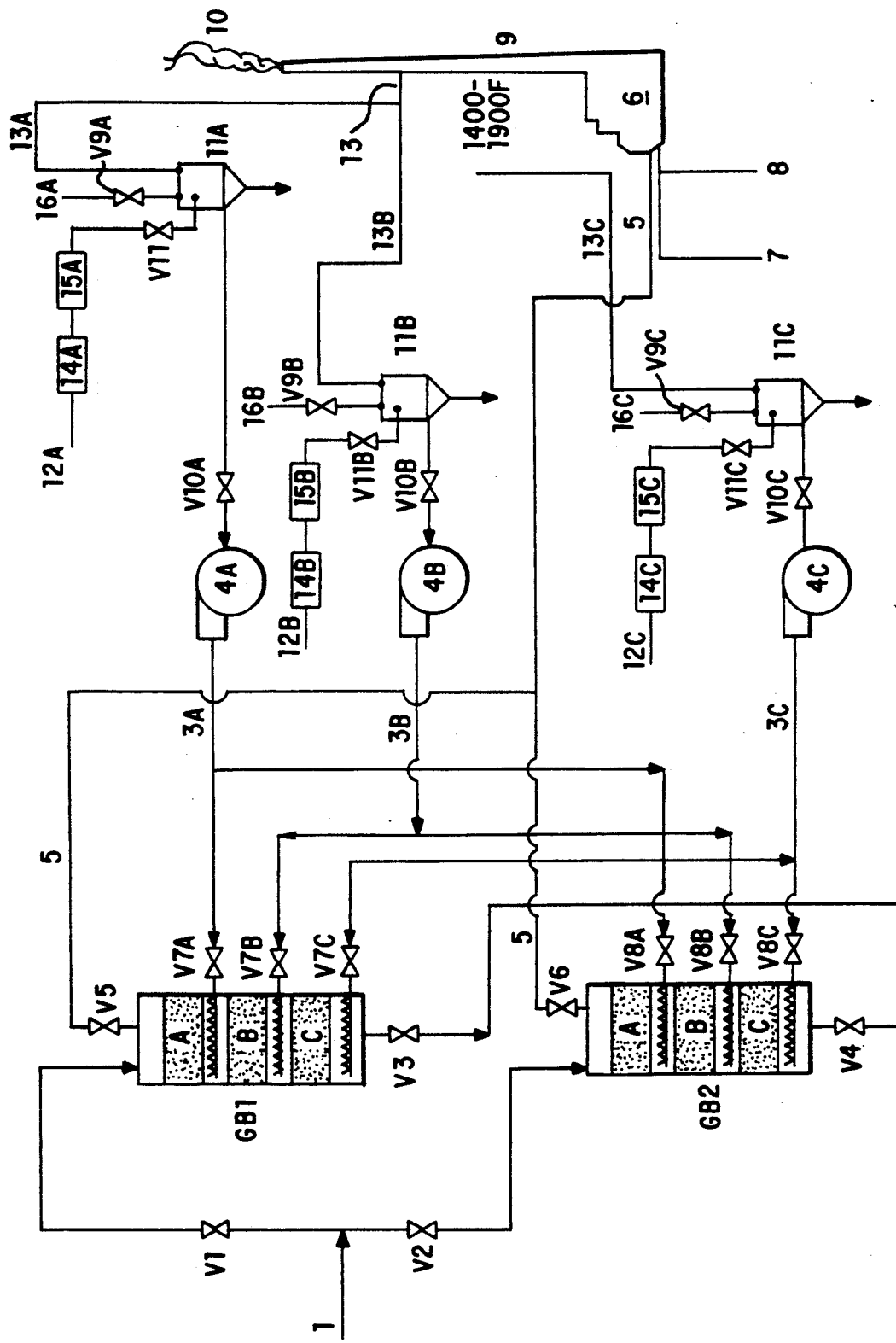
FIG. 3 is a schematic diagram of another embodiment of the apparatus and process of the present invention in which separate regeneration gas streams are directed to individual adsorbent beds.
Figure 5:
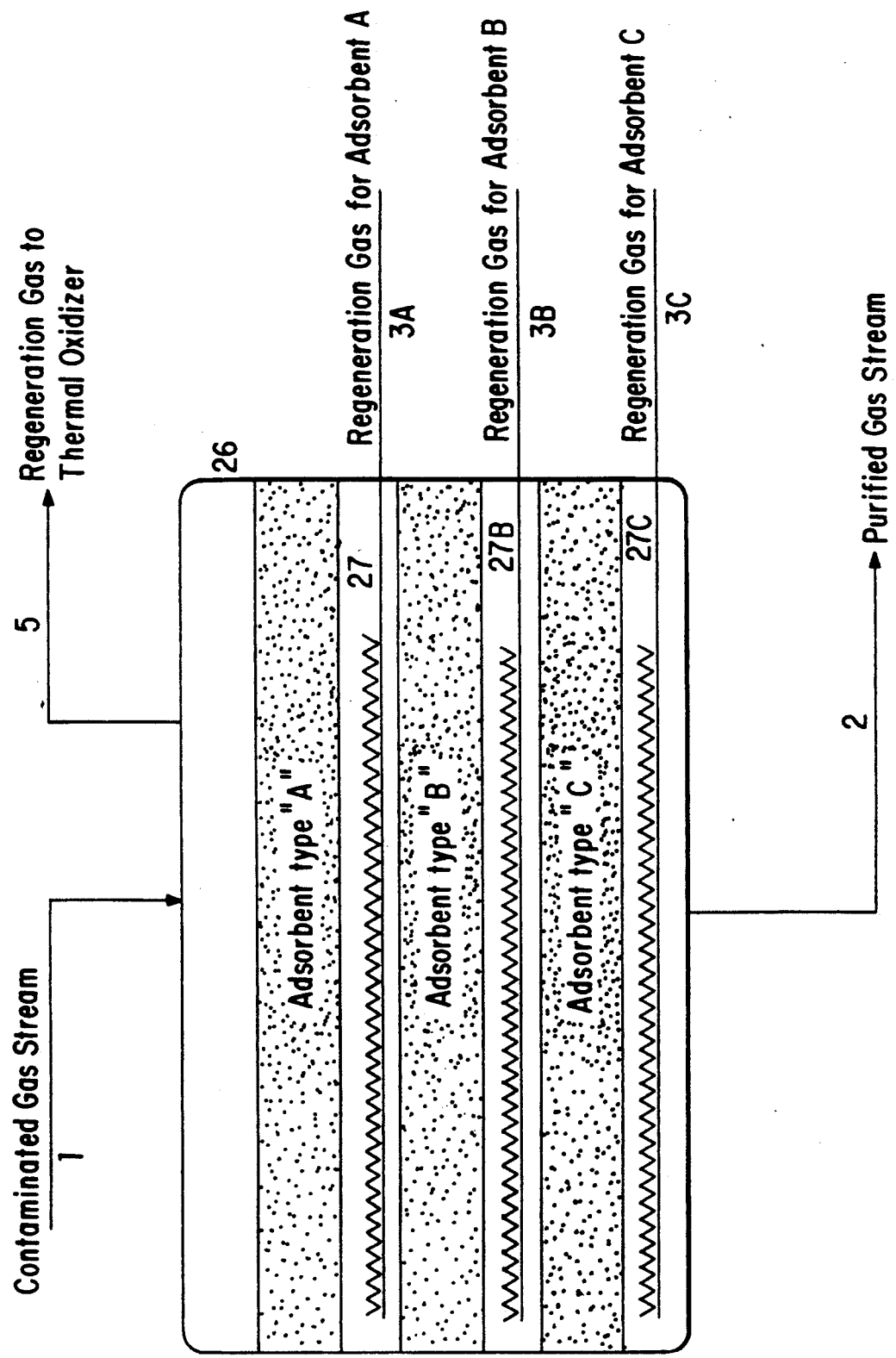
FIG. 5 is a schematic arrangement of another embodiment of means for separating the graded beds using a manifold for individual regeneration gas streams.

Referring to FIG. 3 another embodiment similar to FIG. 1 is shown in which adsorbent vessels GB1 and GB2 include separate regeneration gas streams 3A, 3B and 3C. The adsorbent vessels for use in GB1 and GB2 is shown in FIG. 5 in its preferred embodiment. In this embodiment separate regeneration gas stream 3A-3C are generated by taking separate flue gas streams 13A-13C and directing each stream to a separate cooler 11A-11C, respectively to provide individual temperature/humidity control over the regeneration gas. By providing individually controlled regeneration gas stream to the associated graded beds, desorption of the organics can be made very specific and, hence, very efficient.

Figure 4:
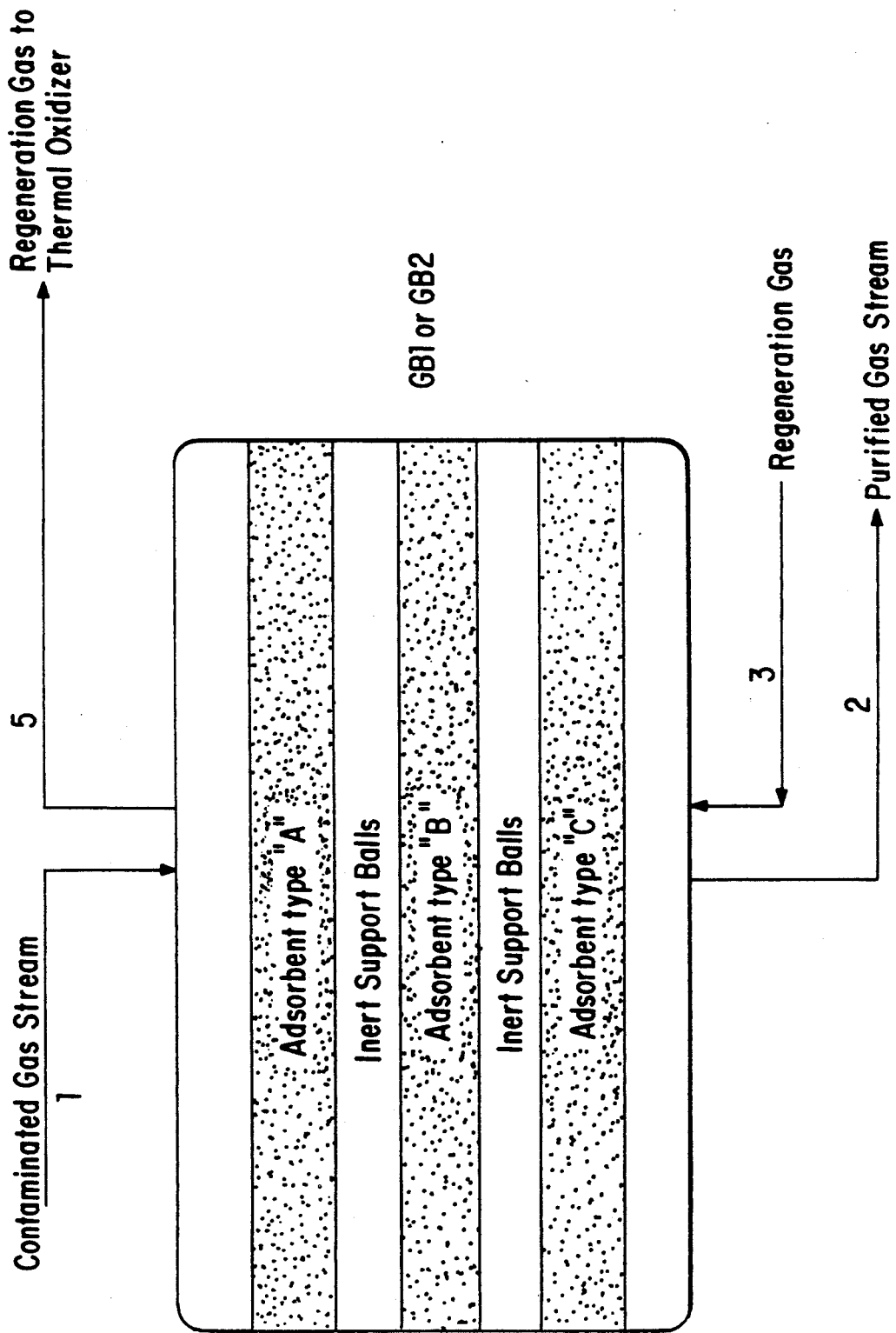
FIG. 4 is a schematic arrangement of a graded bed absorber for use in the embodiment shown in reference to FIG. 3 showing a first means for separating the graded beds.

With reference to FIGS. 4 and 5, two embodiments of an adsorber vessel GB1 and GB2 are shown. In FIG. 4, inert gas containing VOCs is directed through beds A, B and C which are separated by inert material 25 such as ceramic balls or screens. It is desirable to separate the graded beds in order to prevent comingling of the adsorbents. Referring to FIG. 5, adsorbent vessel 26 is shown having inlet stream 1 containing VOCs. Graded bed adsorbant/catalysts A–B are separated by manifold assemblies 27A-27C, respectively. As shown in FIG. 3, these assemblies are in communication with the regeneration gas stream prepared in coolers 11A-11C respectively in which the temperature and humidity of the flue gas 13 can be individually controlled.

While presently preferred embodiments of the invention have been shown and described in particularity, it may be otherwise embodied with the scope of the appended claims.

We claim:

1. A method for removing volatile organic compounds from a gas stream containing such compounds, said method comprising:
   a. passing said gas stream through at least two beds of adsorbent material, each of said beds being different from each other in physical or chemical properties, said properties being selected for effectively removing each organic compound in said gas stream;
   b. discontinuing the passage of said gas stream when volatile organics contained in said stream exits said beds in greater than selected amounts;
   c. regenerating said beds by passing a heated gas therethrough in a counterflow direction to desorb organic compounds contained thereon and produce an effluent gas containing desorbed organic compounds; and
   d. collecting said effluent gas to provide a collected effluent gas.

2. A method as set forth in claim 1 wherein said gas stream is passed through particulate beds, wherein successive beds comprise particulate material of smaller pore diameter.

3. A method as set forth in claim 1 including
   e. thermally oxidizing said collected effluent gas.

4. A method as set forth in claim 1, 2, or 3 including the steps:
   f. preparing a regeneration gas by producing a hot flue gas and cooling same between about 220°-650° F.;
   g. passing said regeneration gas through said adsorbent beds to desorb organic compounds therefrom and regenerate said beds, to produce said effluent gas containing said desorbed organic compounds;
   h. passing said effluent gas through a combustion means used to produce said flue gas; and
   i. thermally oxidizing said organic compounds contained in said effluent gas in said combustion means, thereby producing said hot flue gas for use in step f.

5. A method as set forth in claim 4 wherein said desorbed organics are separated from said collected effluent gas.

6. A method as set forth in claim 4 wherein said heated gas is humidified prior to passage through said adsorbents.

7. A method or set forth in claim 4 wherein said flue gas is cooled by air.

8. A method as set forth in claim 4 wherein said flue gas is cooled by injection of water.

9. A method as set forth in claim 4 wherein said beds are each located in a separate adsorption vessel.

10. A method as set forth in claim 9 wherein said regeneration gas is individually controlled to each bed.

11. A method as set forth in claim 1 including the step of separating said desorbed organic compounds.

12. A method as set forth in claim 1 wherein one of said beds includes a catalyst.

13. A continuous method for removing organic compounds from a fluid stream containing such compounds, said method comprising the steps of:
   a. passing said fluid stream through a first adsorber containing at least two beds of adsorbent materials, each of said beds being different from each other in physical or chemical properties, said properties being selected for effectively removing each organic compound in said gas stream;
   b. discontinuing the passage of said fluid stream when the organic chemicals exiting said first adsorber exceed a predetermined amount and directing said fluid stream to a second adsorber containing at least two beds of adsorbent material similar to said first adsorber;
   c. regenerating said beds of adsorbent material in said first adsorber by directing at least one heated fluid in a counterflow direction through said beds to desorb said organic compounds to provide an effluent fluid stream;
   d. collecting said effluent fluid stream containing desorbed organic compounds;
   e. repeating step (b) through (d) with respect to said second and first adsorbers respectively.

14. A method as set forth in claim 13 wherein said fluid stream is a gas and said organic compounds are volatile.

15. A method as set forth in claim 14 wherein said effluent fluid stream is a gas mixture containing said organic compounds and said effluent gas is thermally oxidized.

16. A method as set forth in claim 13 wherein each of said first and second adsorbers comprises at least two separate vessels each containing one bed of adsorbent material.

17. A method as set forth in claim 16 where regeneration of each of said beds is by counterflowing an individually controlled heated gas through said bed.

18. A method as set forth in claims 13, 14, 15, 16 or 17 wherein said effluent stream is thermally oxidized.

19. A method as set forth in claim 18 wherein one of said heated fluid comprises a portion of the thermal oxidized effluent stream.

20. A method as set forth in claim 13 including the step of removing and separating each organic compound.

21. A system for removing volatile organic materials from a gas stream containing same, said system comprising:
   a. at least a first and second adsorber vessel, each of said first and second adsorber vessel containing at least a first and second adsorbent bed; each bed being different in physical and chemical properties, said properties being selected for removing each organic compound in said gas stream; and each of said adsorbers having a gas stream inlet and outlet and a regeneration gas inlet and effluent gas stream outlet;
   b. Means for controllably directing at least a portion of an effluent gas steam from said gas stream outlet of each of said adsorber vessels to a combustion means;
   c. a combustion means for oxidizing said effluent gas stream directed to it and creating a hot flue gas;

d. cooling means for cooling said hot flue gas to produce a regeneration gas;
e. means for directing at least a portion of said hot flue gas to said cooling means;
f. means for controllably directing said regeneration gas from said cooling means to the regeneration gas inlet of each of said adsorber.

22. A system as set forth in claim 21 wherein each of said first and second adsorber vessels contains a plurality of graded adsorber beds.

23. A system as set forth in claim 22 wherein each of said first and second adsorber vessel comprises a plurality of separate vessels each of which contains one of said adsorber beds.

24. A system as set forth in claim 21, 22 or 23 wherein a separate cooling means is associated with each adsorber bed.

25. A system as set forth in claim 21, 22 or 23 wherein said cooling means comprises an evaporative cooler having water injection means for humidifying the flue gas to provide a humidified regeneration gas.

26. A system as set forth in claim 21, 22 or 23 wherein said means for controllably directing said regeneration gas includes means for directing a separate regeneration gas stream to each of said beds.

27. A system set forth in claim 26 wherein separate cooling means are provided for each of said regeneration gas streams.

28. A system as set forth in claim 21 including means for collecting at least a portion of said gas stream from said gas stream outlet of each adsorber vessel.

29. A system as set forth in claim 28, including condenser means for separating and recovering desorbed organics from said collecting means.

* * * * *

UNITED STATES PATENT AND TRADEMARK OFFICE
CERTIFICATE OF CORRECTION

PATENT NO. : 5,198,001  Page 1 of 2
DATED : March 30, 1993
INVENTOR(S) : William J. Knebel, et al It is certified that error appears in the above-indentified patent and that said Letters Patent is hereby corrected as shown below:

In line 65, Column 1: Delete "VOS" and substitute therefor --VOC's--

In line 49, Column 2: Delete "adsorbent" and substitute therefor --adsorption--

In line 28, Column 2: Delete "graded "beds"" and substitute therefor --"graded-beds"--

In line 29, Column 3: add the word --of-- before the words "organic compounds"

In line 47, Column 3: add --,-- after the word "water"

In line 18, Column 4: after "GB1", delete "and" and add --or--

In line 23, Column 4: the word "contain" should be --contains--

In line 35, Column 4: add --stream-- after the "gas exits bed"

In line 23, Column 5: after "volume", delete the second occurrence of the phrase "of the total"

In line 54, Column 5: after "330 degrees F" insert --,--

In line 6, Column 6: after "5%", delete "of" and add --by--

In line 31, Column 6: after "system", delete "adsorbed" and add --adsorbers--

UNITED STATES PATENT AND TRADEMARK OFFICE
CERTIFICATE OF CORRECTION

PATENT NO. : 5,198,001
DATED : March 30, 1993
INVENTOR(S) : William J. Knebel, et al It is certified that error appears in the above-indentified patent and that said Letters Patent is hereby corrected as shown below:

In line 44, Column 6: after "off-gas", delete "can"

In line 49, Column 6: after "Figure 3" add --,--

In line 60, Column 6: the word "stream" should be --streams--

In line 3, Column 7: "adsorbant" should be --adsorbent-- and "A-B" should be --A-C--

In line 12, Column 7: after "embodied", delete "with" and substitute therefor --within--

In line 64, Column 8: delete "stream" and substitute therefor --stream--

In line 10, Column 9: delete "adsorber" and substitute therefor --adsorbent--

Signed and Sealed this

Twelfth Day of April, 1994

*Attest:*

BRUCE LEHMAN

*Commissioner of Patents and Trademarks*

*Attesting Officer*